US012684340B2

(12) United States Patent
Zhang et al.

(10) Patent No.: US 12,684,340 B2
(45) Date of Patent: Jul. 14, 2026

(54) NEURAL NETWORK PROCESSING MANAGEMENT

(71) Applicant: Apple Inc., Cupertino, CA (US)

(72) Inventors: Yushu Zhang, Beijing (CN); Dawei Zhang, Saratoga, CA (US); Oghenekome Oteri, San Diego, CA (US); Huaning Niu, Los Gatos, CA (US); Wei Zeng, San Diego, CA (US); Weidong Yang, San Diego, CA (US); Hong He, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 18/858,606

(22) PCT Filed: Apr. 28, 2022

(86) PCT No.: PCT/CN2022/089738
§ 371 (c)(1),
(2) Date: Oct. 21, 2024

(87) PCT Pub. No.: WO2023/206193
PCT Pub. Date: Nov. 2, 2023

(65) Prior Publication Data
US 2025/0287196 A1 Sep. 11, 2025

(51) Int. Cl.
*H04W 8/24* (2009.01)
*G06N 3/063* (2023.01)
*H04W 72/04* (2023.01)

(52) U.S. Cl.
CPC .............. *H04W 8/24* (2013.01); *G06N 3/063* (2013.01); *H04W 72/04* (2013.01)

(58) Field of Classification Search
CPC ...... H04B 7/0639; H04W 8/24; H04W 64/00; H04W 72/04; G06N 3/063
See application file for complete search history.

(56) References Cited

U.S. PATENT DOCUMENTS 11,696,119 B2 * 7/2023 Bao ....................... H04W 24/02
455/418
2020/0366537 A1 * 11/2020 Wang ....................... G06N 3/08
(Continued)

FOREIGN PATENT DOCUMENTS

CN 110678846 1/2020
CN 112997435 6/2021
(Continued)

OTHER PUBLICATIONS

International Search Report and Written Opinion for PCT/CN2022/089738; Nov. 28, 2022.

*Primary Examiner* — Frantz B Jean
(74) *Attorney, Agent, or Firm* — Kowert, Hood, Munyon, Rankin & Goetzel, P.C.

(57) ABSTRACT

This disclosure relates to techniques for managing neural network processing resources in a wireless communication system. A wireless device and a cellular base station can establish a wireless link. The wireless device can determine its neural network processing capability. The wireless device can provide neural network processing capability information to the cellular base station. The cellular base station can determine whether and when to configure activities that use neural network processing for the wireless device based at least in part on the neural network processing capability information for the wireless device.

20 Claims, 9 Drawing Sheets

(56)          References Cited

U.S. PATENT DOCUMENTS

| 2020/0367264 | A1* | 11/2020 | Chen ...................... | H04W 72/12 |
| 2021/0185515 | A1* | 6/2021 | Bao ........................ | G06N 3/008 |
| 2021/0326701 | A1* | 10/2021 | Bai ....................... | H04W 24/10 |
| 2023/0164817 | A1* | 5/2023 | Bhamri ................... | H04W 8/24 |
|  |  |  |  | 370/329 |

FOREIGN PATENT DOCUMENTS

| WO | 2021185685 | 9/2021 |
| WO | 2022040664 | 2/2022 |

* cited by examiner

| R | Serving Cell ID | | | | BWP ID | | Oct 1 |
| R | R | Priority | | $S_3$ | $S_2$ | $S_1$ | $S_0$ | Oct 2 |

NEURAL NETWORK PROCESSING MANAGEMENT

PRIORITY INFORMATION

This application is a national stage entry of PCT Application No. PCT/CN2022/089738, entitled "Neural Network Processing Management," filed Apr. 28, 2022, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for managing neural network processing resources in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include LTE, LTE Advanced (LTE-A), NR, HSPA, IEEE 802.11 (WLAN or Wi-Fi), BLUETOOTH™, ultra-wideband (UWB), etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for managing neural network processing resources in a wireless communication system.

According to the techniques described herein, a wireless device can have capability to perform neural network processing, for any of a variety of tasks that can be related to wireless communication, such as for beam prediction, channel state information measurement, positioning estimation, etc., and/or any of a variety of tasks that can be unrelated to wireless communication.

The wireless device can be able to determine its neural network processing capability, for example including a measurement of the maximum number of units of neural network processing capability (which can be referred to as neural network processing units) available to the wireless device, and/or any of various other possible indicators of its neural network processing capability. The wireless device can provide information to a serving cellular base station in a cellular communication system indicating the neural network processing capability of the wireless device.

The cellular base station (and/or other elements of the cellular network associated with the cellular base station) can use the neural network processing capability information for the wireless device to determine whether and when to schedule tasks or activities that can involve neural network processing based on the neural network processing capability of the wireless device. For example, the cellular base station can generally avoid scheduling neural network processing tasks beyond the neural network processing capability of the wireless device at any given time.

Alternatively, or in addition, it can be possible to provide a priority framework for neural network processing tasks. In such a scenario, it can be possible for the cellular base station to schedule a neural network processing task for the wireless device that would be beyond the indicated neural network processing capability of the wireless device if the scheduled task has a higher priority than one or more currently scheduled neural network processing tasks for the wireless device.

Techniques are also described herein for determining the occupancy time for various possible neural network processing tasks, which can allow for duration of neural network processing tasks to be consistently determined by both the cellular network and the wireless device, which can improve the ability of the cellular network to accurately determine when neural network processing resources of the wireless device are and are not available.

Note that the techniques described herein can be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
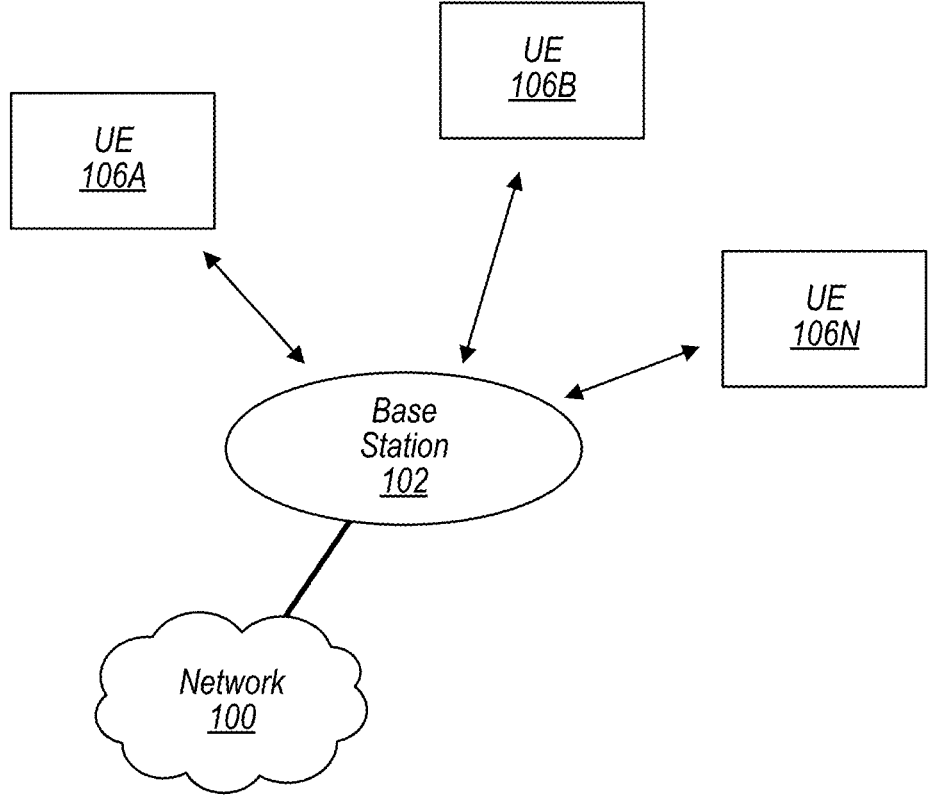
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that can appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location
CSI: Channel State Information
CSI-RS: Channel State Information Reference Signals
CSI-IM: Channel State Information Interference Management
CMR: Channel Measurement Resource
IMR: Interference Measurement Resource
ZP: Zero Power NZP: Non Zero Power
CQI: Channel Quality Indicator
PMI: Precoding Matrix Indicator
RI: Rank Indicator

Terms

The following is a glossary of terms that can appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium can include other types of non-transitory memory as well or combinations thereof. In addition, the memory medium can be located in a first computer system in which the programs are executed, or can be located in a second different computer system which connects to the first computer system over a network, such as the Internet. In the latter instance, the second computer system can provide program instructions to the first computer system for execution. The term "memory medium" can include two or more memory mediums which can reside in different locations, e.g., in different computer systems that are connected over a network. The memory medium can store program instructions (e.g., embodied as computer programs) that can be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or can be stationary or fixed at a certain location. A UE is an example of a wireless device.

Communication Device—any of various types of computer systems or devices that perform communications, where the communications can be wired or wireless. A communication device can be portable (or mobile) or can be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements can include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure can be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form can be automatically filled out by the computer system where the computer system (e.g., software executing on the computer system) analyzes the fields of the form and fills in the form without any user input specifying the answers to the fields. As indicated above, the user can invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components can be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors can be configured to electrically connect a module to another module, even when the two modules are not connected). In some contexts, "configured to" can be a broad recitation of structure generally meaning "having circuitry that" performs the task or tasks during operation. As such, the component can be configured to perform the task even when the component is not currently on. In general, the circuitry that forms the structure corresponding to "configured to" can include hardware circuits.

Various components can be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
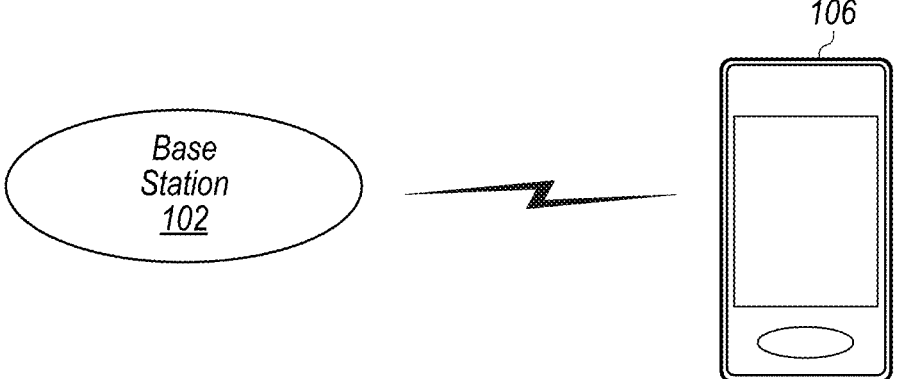
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure can be implemented, according to some embodiments. It is noted that the system of FIG. 1 is merely one example of a possible system, and embodiments can be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices can be referred to herein as a "user equipment" (UE) or UE device. Thus, the user devices 106 are referred to as UEs or UE devices.

The base station 102 can be a base transceiver station (BTS) or cell site, and can include hardware and/or software that enables wireless communication with the UEs 106A through 106N. If the base station 102 is implemented in the context of LTE, it can alternately be referred to as an 'eNodeB' or 'eNB'. If the base station 102 is implemented in the context of 5G NR, it can alternately be referred to as a 'gNodeB' or 'gNB'. The base station 102 can also be equipped to communicate with a network 100 (e.g., a core network of a cellular service provider, a telecommunication network such as a public switched telephone network (PSTN), and/or the Internet, among various possibilities). Thus, the base station 102 can facilitate communication among the user devices and/or between the user devices and the network 100. The communication area (or coverage area) of the base station can be referred to as a "cell." As also used herein, from the perspective of UEs, a base station can sometimes be considered as representing the network insofar as uplink and downlink communications of the UE are concerned. Thus, a UE communicating with one or more base stations in the network can also be interpreted as the UE communicating with the network.

The base station 102 and the user devices can be configured to communicate over the transmission medium using any of various radio access technologies (RATs), also referred to as wireless communication technologies, or telecommunication standards, such as LTE, LTE-Advanced (LTE-A), LAA/LTE-U, 5G NR, Wi-Fi, UWB, etc.

Base station 102 and other similar base stations operating according to the same or a different cellular communication standard can thus be provided as one or more networks of cells, which can provide continuous or nearly continuous overlapping service to UE 106 and similar devices over a geographic area via one or more cellular communication standards.

Note that a UE 106 can be capable of communicating using multiple wireless communication standards. For example, a UE 106 might be configured to communicate using either or both of a 3GPP cellular communication standard or a 3GPP2 cellular communication standard. In some embodiments, the UE 106 can be configured to perform techniques for managing neural network processing resources in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 can be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 can include a processor (processing element) that is configured to execute program instructions stored in memory. The UE 106 can perform any of the method embodiments described herein by executing such stored instructions. Alternatively, or in addition, the UE 106 can include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 can be configured to communicate using any of multiple wireless communication protocols. For example, the UE 106 can be configured to communicate using two or more of LTE, LTE-A, 5G NR, WLAN, UWB, or GNSS. Other combinations of wireless communication standards are also possible.

The UE 106 can include one or more antennas for communicating using one or more wireless communication protocols according to one or more RAT standards. In some embodiments, the UE 106 can share one or more parts of a receive chain and/or transmit chain between multiple wireless communication standards. The shared radio can include a single antenna, or can include multiple antennas (e.g., for multiple-input, multiple-output or "MIMO") for performing wireless communications. In general, a radio can include any combination of a baseband processor, analog RF signal processing circuitry (e.g., including filters, mixers, oscillators, amplifiers, etc.), or digital processing circuitry (e.g., for digital modulation as well as other digital processing). Similarly, the radio can implement one or more receive and transmit chains using the aforementioned hardware. For example, the UE 106 can share one or more parts of a receive and/or transmit chain between multiple wireless communication technologies, such as those discussed above.

In some embodiments, the UE 106 can include any number of antennas and can be configured to use the antennas to transmit and/or receive directional wireless signals (e.g., beams). Similarly, the BS 102 can also include any number of antennas and can be configured to use the antennas to transmit and/or receive directional wireless signals (e.g., beams). To receive and/or transmit such directional signals, the antennas of the UE 106 and/or BS 102 can be configured to apply different "weight" to different antennas. The process of applying these different weights can be referred to as "precoding".

In some embodiments, the UE 106 can include separate transmit and/or receive chains (e.g., including separate antennas and other radio components) for each wireless communication protocol with which it is configured to communicate. As a further possibility, the UE 106 can include one or more radios that are shared between multiple wireless communication protocols, and one or more radios that are used exclusively by a single wireless communication protocol. For example, the UE 106 can include a shared radio for communicating using either of LTE or NR, and separate radios for communicating using each of Wi-Fi and BLUETOOTH™, UWB, etc. Other configurations are also possible.

Figure 3:
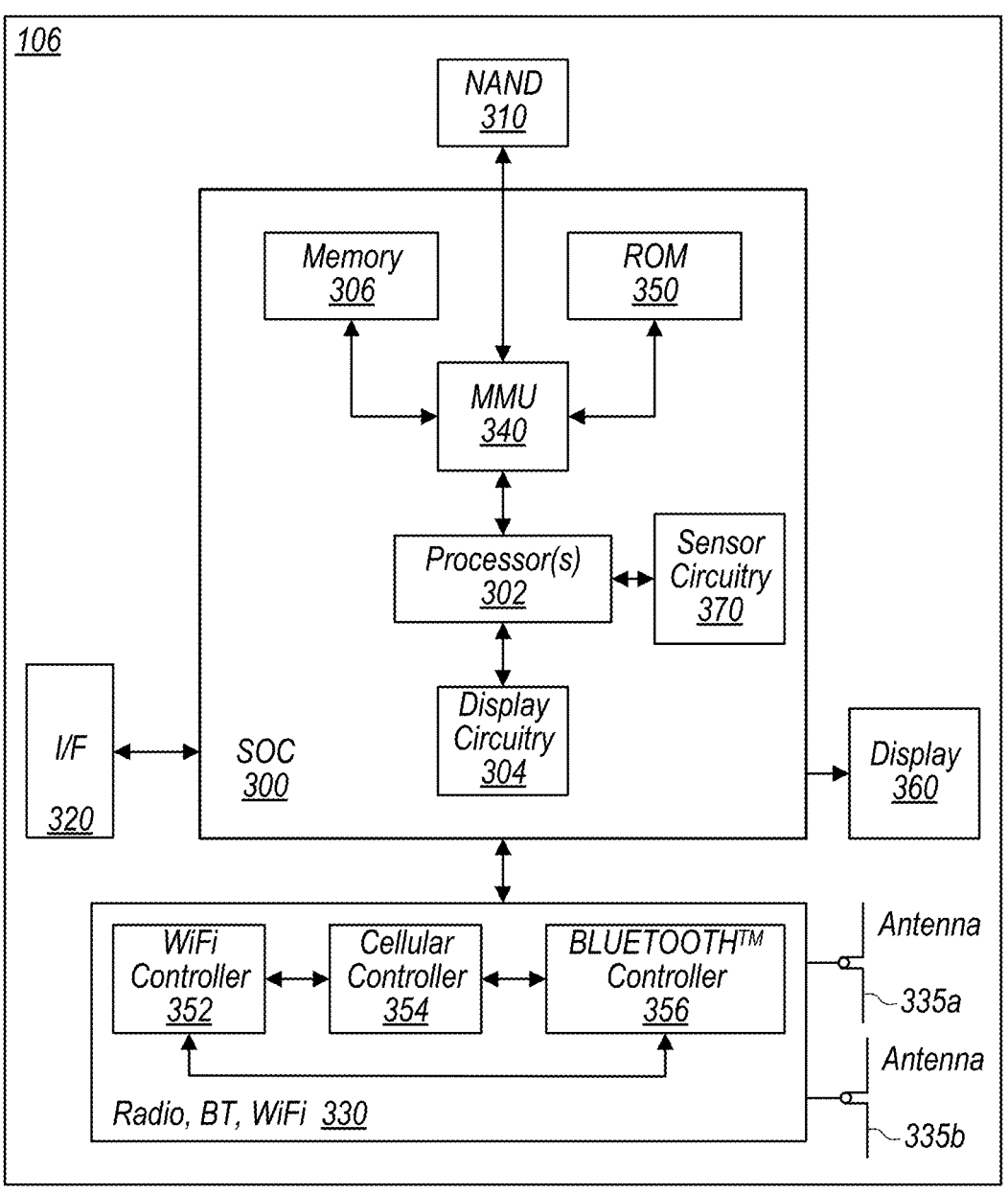
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 can include a system on chip (SOC) 300, which can include portions for various purposes. For example, as shown, the SOC 300 can include processor(s) 302 which can execute program instructions for the UE 106 and display circuitry 304 which can perform graphics processing and provide display signals to the display 360. The SOC 300 can also include sensor circuitry 370, which can include components for sensing or measuring any of a variety of possible characteristics or parameters of the UE 106. For example, the sensor circuitry 370 can include motion sensing circuitry configured to detect motion of the UE 106, for example using a gyroscope, accelerometer, and/or any of various other motion sensing components. As another possibility, the sensor circuitry 370 can include one or more temperature sensing components, for example for measuring the temperature of each of one or more antenna panels and/or other components of the UE 106. Any of various other possible types of sensor circuitry can also or alternatively be included in UE 106, as desired. The processor(s) 302 can also be coupled to memory management unit (MMU) 340, which can be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 can be configured to perform memory protection and page table translation or set up. In some embodiments, the MMU 340 can be included as a portion of the processor(s) 302.

As shown, the SOC 300 can be coupled to various other circuits of the UE 106. For example, the UE 106 can include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, BLUETOOTH™, Wi-Fi, GPS, UWB, etc.). The UE device 106 can include or couple to at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 can include fewer or more antennas. Overall, the one or more antennas are collectively referred to as antenna 335. For example, the UE device 106 can use antenna 335 to perform the wireless communication with the aid of radio circuitry 330. The communication circuitry can include multiple receive chains and/or multiple transmit chains for receiving and/or transmitting multiple spatial streams, such as in a multiple-input multiple output (MIMO) configuration. As noted above, the UE can be configured to communicate wirelessly using multiple wire-less communication standards in some embodiments.

The UE 106 can include hardware and software compo-nents for implementing methods for the UE 106 to perform techniques for managing neural network processing resources in a wireless communication system, such as described further subsequently herein. The processor(s) 302 of the UE device 106 can be configured to implement part or all of the methods described herein, e.g., by executing program instructions stored on a memory medium (e.g., a non-transitory computer-readable memory medium). In other embodiments, processor(s) 302 can be configured as a programmable hardware element, such as an FPGA (Field Programmable Gate Array), or as an ASIC (Application Specific Integrated Circuit). Furthermore, processor(s) 302 can be coupled to and/or can interoperate with other com-ponents as shown in FIG. 3, to perform techniques for managing neural network processing resources in a wireless communication system according to various embodiments disclosed herein. Processor(s) 302 can also implement vari-ous other applications and/or end-user applications running on UE 106.

In some embodiments, radio 330 can include separate controllers dedicated to controlling communications for various respective RAT standards. For example, as shown in FIG. 3, radio 330 can include a Wi-Fi controller 352, a cellular controller (e.g., LTE and/or LTE-A controller) 354, and BLUETOOTH™ controller 356, and in at least some embodiments, one or more or all of these controllers can be implemented as respective integrated circuits (ICs or chips, for short) in communication with each other and with SOC 300 (and more specifically with processor(s) 302). For example, Wi-Fi controller 352 can communicate with cel-lular controller 354 over a cell-ISM link or WCI interface, and/or BLUETOOTH™ controller 356 can communicate with cellular controller 354 over a cell-ISM link, etc. While three separate controllers are illustrated within radio 330, other embodiments have fewer or more similar controllers for various different RATs that can be implemented in UE device 106.

Further, embodiments in which controllers can implement functionality associated with multiple radio access technolo-gies are also envisioned. For example, according to some embodiments, the cellular controller 354 may, in addition to hardware and/or software components for performing cel-lular communication, include hardware and/or software components for performing one or more activities associated with Wi-Fi, such as Wi-Fi preamble detection, and/or gen-eration and transmission of Wi-Fi physical layer preamble signals.

Figure 4:
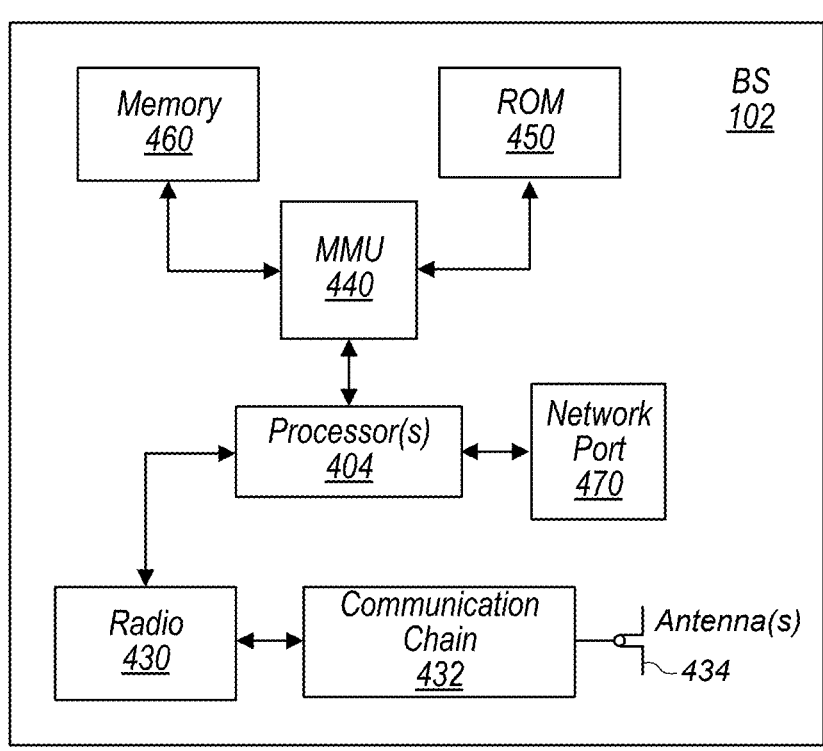
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 can include processor(s) 404 which can execute program instructions for the base station 102. The processor(s) 404 can also be coupled to memory management unit (MMU) 440, which can be configured to receive addresses from the processor(s) 404 and translate those addresses to locations in memory (e.g., memory 460 and read only memory (ROM) 450) or to other circuits or devices.

The base station 102 can include at least one network port 470. The network port 470 can be configured to couple to a telephone network and provide a plurality of devices, such as UE devices 106, access to the telephone network as described above in FIGS. 1 and 2. The network port 470 (or an additional network port) can also or alternatively be configured to couple to a cellular network, e.g., a core network of a cellular service provider. The core network can provide mobility related services and/or other services to a plurality of devices, such as UE devices 106. In some cases, the network port 470 can couple to a telephone network via the core network, and/or the core network can provide a telephone network (e.g., among other UE devices serviced by the cellular service provider).

In some embodiments, base station 102 can be a next generation base station, e.g., a 5G New Radio (5G NR) base station, or "gNB". In such embodiments, base station 102 can be connected to a legacy evolved packet core (EPC) network and/or to a NR core (NRC) network. In addition, base station 102 can be considered a 5G NR cell and can include one or more transmission and reception points (TRPs). In addition, a UE capable of operating according to 5G NR can be connected to one or more TRPs within one or more gNBs.

The base station 102 can include at least one antenna 434, and possibly multiple antennas. The antenna(s) 434 can be configured to operate as a wireless transceiver and can be further configured to communicate with UE devices 106 via radio 430. The antenna(s) 434 communicates with the radio 430 via communication chain 432. Communication chain 432 can be a receive chain, a transmit chain or both. The radio 430 can be designed to communicate via various wireless telecommunication standards, including, but not limited to, 5G NR, 5G NR SAT, LTE, LTE-A, Wi-Fi, UWB, etc.

The base station 102 can be configured to communicate wirelessly using multiple wireless communication stan-dards. In some instances, the base station 102 can include multiple radios, which can enable the base station 102 to communicate according to multiple wireless communication technologies. For example, as one possibility, the base station 102 can include an LTE radio for performing com-munication according to LTE as well as a 5G NR radio for performing communication according to 5G NR. In such a case, the base station 102 can be capable of operating as both an LTE base station and a 5G NR base station. As another possibility, the base station 102 can include a multi-mode radio which is capable of performing communications according to any of multiple wireless communication tech-nologies (e.g., 5G NR and Wi-Fi, 5G NR SAT and Wi-Fi, LTE and Wi-Fi, LTE and UWB, etc.). Other configurations are possible.

As described further subsequently herein, the BS 102 can include hardware and software components for implement-ing or supporting implementation of features described herein. The processor 404 of the base station 102 can be configured to implement and/or support implementation of part or all of the methods described herein, e.g., by executing program instructions stored on a memory medium (e.g., a non-transitory computer-readable memory medium). Alternatively, the processor 404 can be configured as a programmable hardware element, such as an FPGA (Field Programmable Gate Array), or as an ASIC (Application Specific Integrated Circuit), or a combination thereof. In the case of certain RATs, for example Wi-Fi, base station 102 can be designed as an access point (AP), in which case network port 470 can be implemented to provide access to a wide area network and/or local area network(s), e.g., it can include at least one Ethernet port, and radio 430 can be designed to communicate according to the Wi-Fi standard.

In addition, as described herein, processor(s) 404 can include one or more processing elements. Thus, processor(s) 404 can include one or more integrated circuits (ICs) that are configured to perform the functions of processor(s) 404. In addition, each integrated circuit can include circuitry (e.g., first circuitry, second circuitry, etc.) configured to perform the functions of processor(s) 404.

Further, as described herein, radio 430 can include one or more processing elements. Thus, radio 430 can include one or more integrated circuits (ICs) that are configured to perform the functions of radio 430. In addition, each integrated circuit can include circuitry (e.g., first circuitry, second circuitry, etc.) configured to perform the functions of radio 430.

Reference Signals

A wireless device, such as a user equipment, can be configured to perform a variety of tasks that include the use of reference signals (RS) provided by one or more cellular base stations. For example, initial access and beam measurement by a wireless device can be performed based at least in part on synchronization signal blocks (SSBs) provided by one or more cells provided by one or more cellular base stations within communicative range of the wireless device. Another type of reference signal commonly provided in a cellular communication system can include channel state information (CSI) RS. Various types of CSI-RS can be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE can periodically perform channel measurements and send channel state information (CSI) to a BS. The base station can then receive and use this channel state information to determine an adjustment of various parameters during communication with the wireless device. In particular, the BS can use the received channel state information to adjust the coding of its downlink transmissions to improve downlink channel quality.

In many cellular communication systems, the base station can transmit some or all such reference signals (or pilot signals), such as SSB and/or CSI-RS, on a periodic basis. In some instances, aperiodic reference signals (e.g., for aperiodic CSI reporting) can also or alternatively be provided.

As a detailed example, in the 3GPP NR cellular communication standard, the channel state information fed back from the UE based on CSI-RS for CSI acquisition can include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

The channel quality information can be provided to the base station for link adaptation, e.g., for providing guidance as to which modulation & coding scheme (MCS) the base station should use when it transmits data. For example, when the downlink channel communication quality between the base station and the UE is determined to be high, the UE can feed back a high CQI value, which can cause the base station to transmit data using a relatively high modulation order and/or a low channel coding rate. As another example, when the downlink channel communication quality between the base station and the UE is determined to be low, the UE can feed back a low CQI value, which can cause the base station to transmit data using a relatively low modulation order and/or a high channel coding rate.

PMI feedback can include preferred precoding matrix information, and can be provided to a base station in order to indicate which MIMO precoding scheme the base station should use. In other words, the UE can measure the quality of a downlink MIMO channel between the base station and the UE, based on a pilot signal received on the channel, and can recommend, through PMI feedback, which MIMO precoding is desired to be applied by the base station. In some cellular systems, the PMI configuration is expressed in matrix form, which provides for linear MIMO precoding. The base station and the UE can share a codebook composed of multiple precoding matrixes, where each MIMO precoding matrix in the codebook can have a unique index. Accordingly, as part of the channel state information fed back by the UE, the PMI can include an index (or possibly multiple indices) corresponding to the most preferred MIMO precoding matrix (or matrixes) in the codebook. This can enable the UE to minimize the amount of feedback information. Thus, the PMI can indicate which precoding matrix from a codebook should be used for transmissions to the UE, at least according to some embodiments.

The rank indicator information (RI feedback) can indicate a number of transmission layers that the UE determines can be supported by the channel, e.g., when the base station and the UE have multiple antennas, which can enable multi-layer transmission through spatial multiplexing. The RI and the PMI can collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes can be defined (e.g., where R represents the number of layers, $N_t$ represents the number of transmitter antenna ports, and N represents the size of the codebook). In such a scenario, the number of transmission layers (R) can conform to a rank value of the precoding matrix ($N_t \times R$ matrix), and hence in this context R can be referred to as the "rank indicator (RI)".

Thus, the channel state information can include an allocated rank (e.g., a rank indicator or RI). For example, a MIMO-capable UE communicating with a BS can include four receiver chains, e.g., can include four antennas. The BS can also include four or more antennas to enable MIMO communication (e.g., 4×4 MIMO). Thus, the UE can be capable of receiving up to four (or more) signals (e.g., layers) from the BS concurrently. Layer to antenna mapping can be applied, e.g., each layer can be mapped to any number of antenna ports (e.g., antennas). Each antenna port can send and/or receive information associated with one or more layers. The rank can include multiple bits and can indicate the number of signals that the BS can send to the UE in an upcoming time period (e.g., during an upcoming transmission time interval or TTI). For example, an indication of rank 4 can indicate that the BS will send 4 signals to the UE. As one possibility, the RI can be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
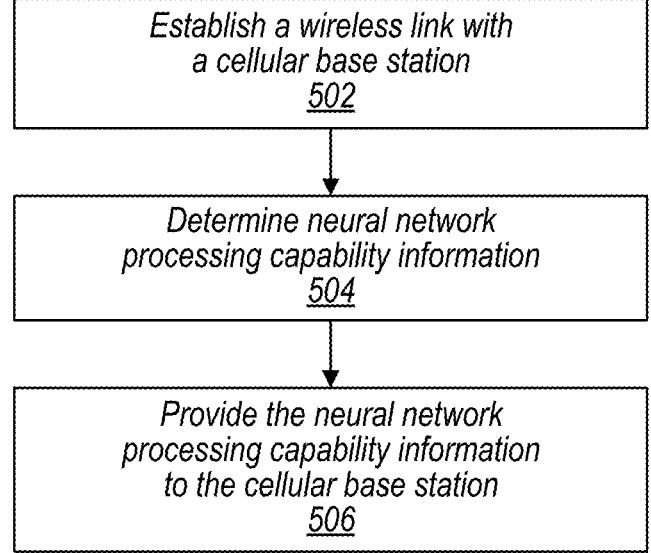
FIG. 5 is a flowchart diagram illustrating aspects of an exemplary possible method for managing neural network processing resources in a wireless communication system, according to some embodiments.

FIG. 5—Neural Network Processing Management

There can be significant benefits to introducing machine learning techniques, for example including the use of neural networks, to wireless communication systems. For example, such techniques can offer the possibility of greater accuracy, greater speed, and/or reduced power cost when used to perform certain wireless communication tasks, at least in some embodiments. Some areas in which machine learning can be introduced to facilitate wireless communication, at least according to some embodiments, could include beam prediction in time and/or spatial domains, channel state information measurement and reporting, and/or positioning estimation.

As machine learning techniques become more widespread, there is also the possibility that such machine learning tools can be used by a wireless device for any of a variety of possible non-wireless-communication purposes, such as by other applications active on the wireless device.

Accordingly, it can be useful to provide techniques for managing the machine learning processing resources of a wireless device, e.g., to help prevent or reduce the likelihood that more demand is placed on the machine learning processing resources of the wireless device than the wireless device is capable of handling. To illustrate one such set of possible techniques, FIG. 5 is a flowchart diagram illustrating a method for managing neural network processing resources in a wireless communication system, at least according to some embodiments.

Aspects of the method of FIG. 5 can be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device can be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 can be used in any suitable wireless communication system, as desired. In various embodiments, some of the elements of the methods shown can be performed concurrently, in a different order than shown, can be substituted for by other method elements, or can be omitted. Additional method elements can also be performed as desired. As shown, the method of FIG. 5 can operate as follows.

In 502, the wireless device can establish a wireless link with a cellular base station. According to some embodiments, the wireless link can include a cellular link according to 5G NR. For example, the wireless device can establish a session with an AMF entity of the cellular network by way of one or more gNBs that provide radio access to the cellular network. As another possibility, the wireless link can include a cellular link according to LTE. For example, the wireless device can establish a session with a mobility management entity of the cellular network by way of an eNB that provides radio access to the cellular network. Other types of cellular links are also possible, and the cellular network can also or alternatively operate according to another cellular communication technology, according to various embodiments.

Establishing the wireless link can include establishing a RRC connection with a serving cellular base station, at least according to some embodiments. Establishing the first RRC connection can include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device can operate in a RRC connected state. In some instances, the RRC connection can also be released (e.g., after a certain period of inactivity with respect to data communication), in which case the wireless device can operate in a RRC idle state or a RRC inactive state. In some instances, the wireless device can perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device can establish multiple wireless links, e.g., with multiple TRPs of the cellular network, according to a multi-TRP configuration. In such a scenario, the wireless device can be configured (e.g., via RRC signaling) with one or more transmission control indicators (TCIs), e.g., which can correspond to various beams that can be used to communicate with the TRPs. Further, it can be the case that one or more configured TCI states can be activated by media access control (MAC) control element (CE) for the wireless device at a particular time.

At least in some instances, establishing the wireless link(s) can include the wireless device providing capability information for the wireless device. Such capability information can include information relating to any of a variety of types of wireless device capabilities. As further described subsequently herein, one such type of capability information can relate to the neural network processing capability of the wireless device.

In 504, the wireless device can determine neural network processing capability information for the wireless device. The neural network processing capability information can include a number of supported neural network processing units (NPUs) for the wireless device. The number of supported NPUs for the wireless device can represent a maximum total neural network processing capability for the wireless device, or possibly can represent an amount of neural network processing capability available for use for wireless communication with the cellular base station.

In some embodiments, it can also or alternatively be possible that the neural network processing capability information is determined with a finer granularity. For example, neural network processing capability information, potentially including a number of supported NPUs, can be determined for each of one or more specific types of neural network processing tasks that can be configured in the wireless communication system, such as beam prediction in spatial domain, beam prediction in time domain, channel state information measurement and reporting, and/or positioning estimation.

In some instances, the neural network processing capability information can include availability information for the neural network processing resources of the wireless device. For example, the neural network processing capability information could indicate that the indicated number of supported NPUs for the wireless device are always available for neural network processing tasks associated with the wireless link, e.g., if the neural network processing resources of the wireless device are dedicated for such a purpose and limiting power consumption is not a high priority consideration. As another example, the neural network processing capability information could indicate one or more of a preferred on duration, a preferred off duration, a preferred periodicity, and/or other information facilitating shared use (e.g., with other wireless- or non-wireless-applications) and/or power saving according to a periodic discontinuous availability pattern for the indicated number of supported NPUs for the wireless device. As a still further possibility, a hybrid approach could be used, for example in which a certain portion of NPUs of the wireless device are always available for neural network processing tasks associated with the wireless link while another portion of NPUs of the wireless device are available for neural network processing tasks associated with the wireless link according to a preferred on/off duration and periodicity, in which case that neural network processing capability information could indicate this hybrid availability.

As another possibility, it can be the case that the neural network processing capability information indicates further neural network processing capability information for one or more NPUs of the wireless device, such as a (e.g., maximum) number of layers and a (e.g., maximum) number of nodes per layer with which the wireless device is capable of performing neural network processing for the NPU(s). Such capability information can be indicated for the NPUs of the wireless device collectively, or individually, or in groups (e.g., with each group of NPU associated with a type or use for the group of NPUs, such as NPUs for beam prediction, NPUs for CSI measurement, NPUs for positioning, etc.), according to various embodiments.

In 506, the wireless device can provide the neural network processing capability information to the cellular base station. The neural network processing capability information can be provided when establishing a RRC connection, or while a RRC connection is already established, according to various embodiments.

The cellular base station can determine whether and when to schedule tasks that can involve neural network processing for the wireless device, and can proceed to configure one or more neural network processing activities for the wireless device, based at least in part on the neural network processing capability information for the wireless device.

In some instances, such as if the neural network processing capability information for the wireless device includes neural network processing availability information indicating limited availability for some or all NPUs of the wireless device for tasks associated with the wireless link, the cellular base station can determine an availability pattern for NPUs for the wireless device, and can provide an indication of the determined availability pattern for NPUs for the wireless device to the wireless device. In some instances, the availability pattern can include a discontinuous availability pattern, e.g., in which some or all of an on duration, off duration, and periodicity according to which the discontinuously available NPUs of the wireless device are available for neural network processing tasks associated with the wireless link (or possibly more generally for wireless communication tasks). As another possibility, the availability pattern can include a dynamic availability pattern, e.g., in which various time windows with various numbers of NPUs of the wireless device are available for neural network processing tasks associated with the wireless link (or possibly more generally for wireless communication tasks). Such a dynamic availability pattern can repeat according to a configured periodicity, persist for a certain duration, and/or be enabled at a configured offset after being signaled, in some instances.

The cellular base station can limit the number and type of neural network processing activities configured for the wireless device at any given time to be within neural network processing capability for the wireless device, in some instances. For example, the cellular base station can assign neural network processing tasks that adhere to a maximum number of layers and nodes per layer supported by the wireless device and indicated in the neural network processing capability information, according to some embodiments. Similarly, the cellular base station can assign neural network processing tasks that require no more than a maximum number of NPUs supported by the wireless device and indicated in the neural network processing capability information, according to some embodiments. Alternatively, it can be possible for the cellular base station to exceed neural network processing capability for the wireless device with the number and/or type of neural network processing activities configured for the wireless device, in some instances, e.g., if there are priority indications and/or rules with which the wireless can determine which of the configured tasks to perform and which to drop.

Such priority indications can be provided using RRC signaling, (e.g., configured for each NPU related task), configured by MAC CE (e.g., using the triggering MAC CE for a semi-persistent report), or by a triggering DCI, according to various possibilities. As another possibility, static or semi-static priority rules can be configured or pre-defined, such as that later-triggered reports have higher priority (e.g., aperiodic reports can have higher priority than semi-persistent reports, which can have higher priority than periodic reports, as one possibility). Other priority ordering rules, for example to determine priority order for tasks with the same priority indicator (e.g., tasks associated with a primary cell are higher priority than tasks associated with a secondary cell; tasks associated with beam measurement are higher priority than tasks associated with channel state information measurement, which in turn are higher priority than tasks associated with positioning estimation; tasks starting earlier are higher priority than tasks starting later; and/or any of various other possibilities), are also possible.

If the cellular base station does configure neural network processing activity greater than the neural network processing capability for the wireless device, the wireless device can identify such a circumstance and determine one or more neural network processing activities to drop, e.g., based at least in part on neural network processing activity configured by the cellular base station being greater than neural network processing capability for the wireless device, and possibly based at least in part on priority indications provided for the neural network processing activities. The one or more neural network processing activities dropped by the wireless device can include those that are lowest in priority, and it can be the case that only enough neural network processing activities are dropped such that the remaining neural network processing activities are within the capability of the wireless device to perform, at least according to some embodiments.

Another aspect of determining whether and when to schedule neural network processing tasks can include the determining the duration for which a neural network processing unit is occupied with a given neural network processing task, which can also be referred to as the NPU occupancy for the neural network processing task. Various rules can be configured (e.g., via broadcast system information or dedicated signaling) and/or specified (e.g., in 3GPP technical specifications) to facilitate consistent determination of the NPU occupancy for various possible neural network processing tasks.

As one possible NPU occupancy rule, for artificial intelligence (e.g., neural network) based beam prediction, for periodic reports or semi-persistent reports, a NPU can be considered occupied starting from the first symbol of the first downlink reference signal for measurement until the last symbol of the uplink channel with reported information on the predicted beam(s). Alternatively, in such a scenario, a NPU can be considered occupied starting from a certain number of symbols (e.g., a "first" offset) after the last symbol of the last downlink reference signal for measurement until a certain number of symbols (e.g., a "second" offset) before the first symbol of the uplink channel with reported information on the predicted beam(s). For artificial intelligence based beam prediction, for aperiodic reports, a NPU can be considered occupied starting from the first symbol of the control channel transmission (e.g., physical downlink control channel (PDCCH) transmission) triggering the report until the last symbol of the uplink channel with reported information on the predicted beam(s). Alternatively, in such a scenario, a NPU can be considered occupied starting from a certain number of symbols (e.g., the first offset or another offset) after the last symbol of the control channel transmission triggering the report until a certain number of symbols (e.g., the second offset or another offset) before the first symbol of the uplink channel with reported information on the predicted beam(s). Note that the offset values can be determined based on wireless device capability information, or can be predefined (e.g., in 3GPP technical specifications), according to various embodiments.

As another possible NPU occupancy rule, for artificial intelligence based CSI measurement and reporting, for periodic reports or semi-persistent reports, a NPU can be considered occupied starting from the first symbol of the first channel measurement resource (CMR) or interference measurement resource (IMR) until the last symbol of the uplink channel with the CSI report. Alternatively, in such a scenario, a NPU can be considered occupied starting from a certain number of symbols (e.g., the first offset or another offset) after the last symbol of the last CMR or IMR until a certain number of symbols (e.g., the second offset or another offset) before the first symbol of the uplink channel with the CSI report. For artificial intelligence based CSI measurement and reporting, for aperiodic reports, a NPU can be considered occupied starting from the first symbol of the control channel transmission triggering the report until the last symbol of the uplink channel with the CSI report. Alternatively, in such a scenario, a NPU can be considered occupied starting from a certain number of symbols (e.g., the first offset or another offset) after the last symbol of the control channel transmission triggering the report until a certain number of symbols (e.g., the second offset or another offset) before the first symbol of the uplink channel with the CSI report. As in the preceding examples, the offset values can be determined based on wireless device capability information, or can be predefined, according to various embodiments.

As a further possible NPU occupancy rule, for artificial intelligence based positioning estimation, a NPU can be considered occupied starting from the first symbol of the positioning reference signal (PRS) until a certain number (e.g., a "third" offset) of symbols or slots has passed. Again, the offset value can be determined based on wireless device capability information, or can be predefined, according to various embodiments.

Note that numerous other NPU occupancy rules are also possible. The NPU occupancy rules can be used to determine how long the NPUs assigned to a scheduled task are occupied, and thus when those NPUs are available again. Additionally, or alternatively, in a scenario in which some or all NPUs of the wireless device have discontinuous availability for tasks associated with the wireless link, the NPU occupancy rules can be used to determine whether a wireless device has a sufficient duration and quantity of NPU availability to complete a neural network processing task that the cellular base station might schedule before going into an off duration period. Various other uses for the NPU occupancy rules are also possible.

Thus, at least according to some embodiments, the method of FIG. 5 can be used to provide a framework according to which a wireless device and a cellular network can manage the machine learning processing resources of a wireless device for wireless communication with the cellular network and for other purposes, at least in some instances.

FIGS. 6-13 and Additional Information

FIGS. 6-13 illustrate further aspects that might be used in conjunction with the method of FIG. 5 if desired. It should be noted, however, that the exemplary details illustrated in and described with respect to FIGS. 6-13 are not intended to be limiting to the disclosure as a whole: numerous variations and alternatives to the details provided herein below are possible and should be considered within the scope of the disclosure.

Figure 6:
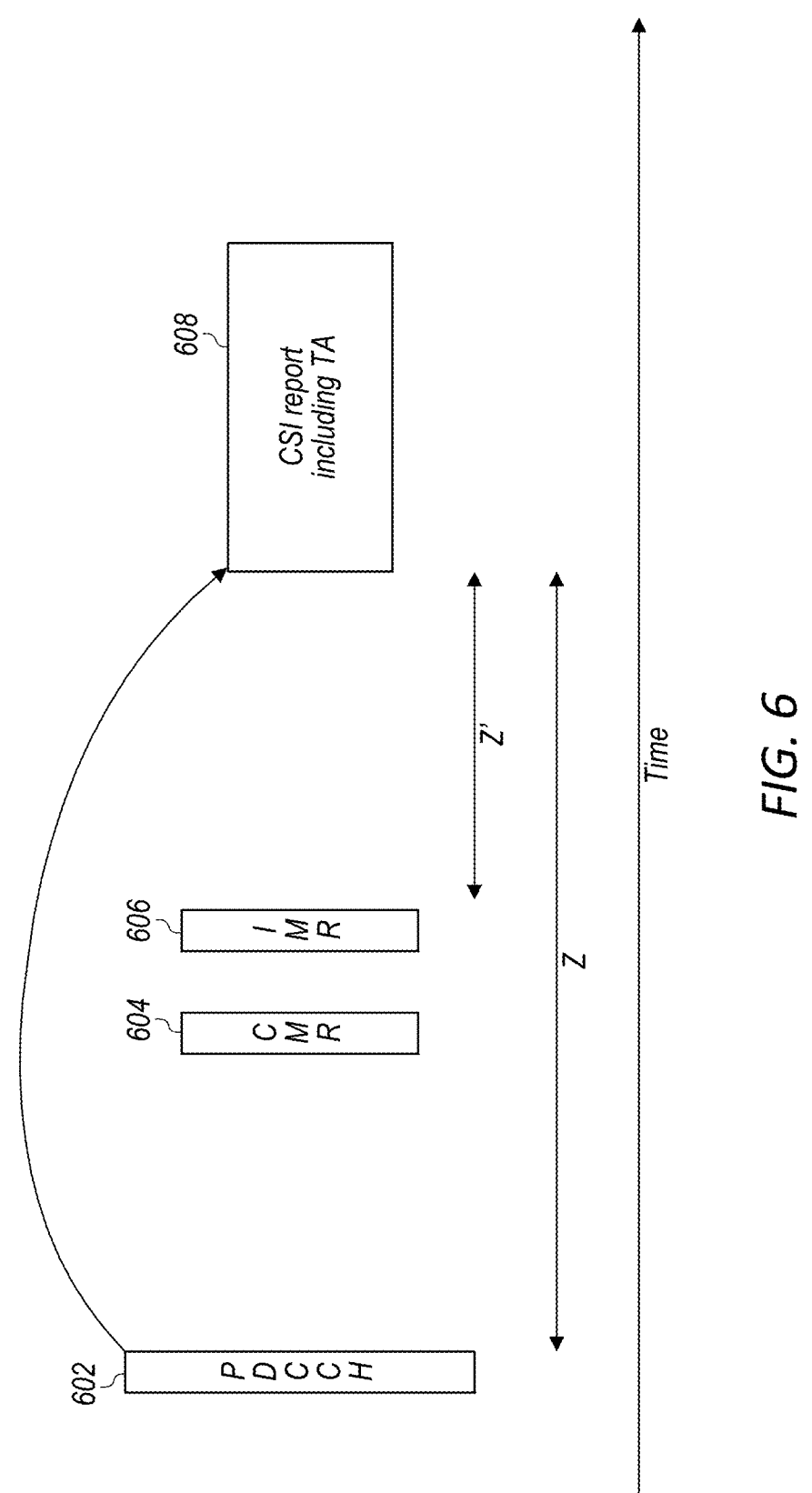
FIG. 6 illustrates possible example timing aspects for a wireless communication system following Z and Z' offset requirements when scheduling a CSI report, according to some embodiments.

In 3GPP Release 15, for channel state information (CSI) processing, there are minimal processing delay and CSI processing unit occupancy rules defined with regard to different kinds of UE capability for CSI measurement and reporting. For example, it can be the case that for a CSI report, the gNB scheduling the report can follow certain minimal Z and Z' requirements. FIG. 6 illustrates possible example timing aspects for a wireless communication system following such Z and Z' requirements when scheduling a CSI report, according to some embodiments. Z can be defined as the offset between the last symbol of the PDCCH 602 scheduling the CSI report and the first symbol of the CSI report 608 (including timing advance), as one possibility. Z' can be defined as the offset between the last symbol of channel measurement resource (CMR) 604 and interference measurement resource (IMR) 606 and the first symbol of the CSI report 608 (including timing advance), as one possibility. If a gNB schedules a CSI report with smaller offset than the defined minimum value of Z or Z', the UE can report the quality for an outdated (e.g., previous) CSI measurement, at least according to some embodiments.

A CSI processing unit (CPU) can be used as a measurement unit for the CSI processing capability of a UE in a cellular communication system, such as a system that operates according to certain 3GPP technical specifications. In some instances, a UE can report its CPU capability (e.g., in terms of a number of CPUs), and a UE can be able to process one or more than one CSI measurement and report, where the number and/or type that the UE is capable of measurement and reporting can be based at least in part on the UE's CPU capability. CPU occupancy rules can specify for what period a CPU of a UE is considered occupied when CSI measurement and reporting is configured. For example, it can be the case that a periodic or semi-persistent CSI report (excluding an initial semi-persistent CSI report on PUSCH after the PDCCH triggering the report) occupies CPU(s) from the first symbol of the earliest one of each CSI-RS/CSI-IM/SSB resource for channel or interference measurement, respective latest CSI-RS/CSI-IM/SSB occasion no later than the corresponding CSI reference resource, until the last symbol of the configured PUSCH/PUCCH carrying the report. As another example, it can be the case that an aperiodic CSI report occupies CPU(s) from the first symbol after the PDCCH triggering the CSI report until the last symbol of the scheduled PUSCH carrying the report. As a still further example, it can be the case that an initial semi-persistent CSI report on PUSCH after the PDCCH trigger occupies CPU(s) from the first symbol after the PDCCH until the last symbol of the scheduled PUSCH carrying the report. Further possible CPU definition information can be provided in 3GPP TS 38.214 v.17.0.0 section 5.2.1.6, at least according to some embodiments.

Interest in making use of machine learning techniques in 3GPP based communication systems (e.g., potentially in 3GPP release 18, as one possibility) is generally increasing. For example, machine learning can be introduced to facilitate wireless communication in beam prediction in time and/or spatial domains, in CSI measurement and reporting, in positioning estimation, and/or various other possible aspects of wireless communication. Accordingly, it could be possible that a UE may need or be expected to perform parallel machine learning processing for such areas and/or other potential areas in which machine learning techniques can be applicable.

Neural networks are one possible type of machine learning tool that could be used in such a context. There can be the possibility that neural network processing capability (e.g., neural network processing unit or NPU) can provided in a UE device and can be used in conjunction with such machine learning techniques. Such NPU capability in a UE can be dedicated for wireless communication or can be shared with other applications or UE resources, according to various embodiments.

Given such potential uses for machine learning techniques (such as use of neural networks), it can be useful to provide techniques for managing UE machine learning resources and/or capabilities. For example, it can be possible to provide a framework for UE NPU capability and NPU occupancy rules, and/or to provide a discontinuous usage scheme (e.g., similar to discontinuous reception schemes) for NPUs, e.g., that can be shared for non-wireless communication purposes in a UE. In some instances, such a framework can include defining a NPU as a specific or alternative type of CPU (e.g., a type-2 CSI processing unit or Type-2 CPU, as one possibility).

As noted, one aspect of a machine learning resource management framework can include UE capability reporting. In one example, this can include a UE reporting its capability on a maximum number of supported NPUs. The capability could be reported per UE or per band combination or per band, according to various embodiments. With regard to different processing complexity for different areas, a UE can report maximum number of supported NPUs for different types of areas. For example, a UE can report a maximum number of supported NPUs for beam prediction in spatial domain, a maximum number of supported NPUs for beam prediction in time domain, a maximum number of supported NPUs for CSI report, a maximum number of supported NPUs for positioning, etc. As another possibility, the occupied NPU number for different use cases can be defined in 3GPP technical specifications and a single NPU processing capability can be reported by a given UE. It can be the case that the UE is not expected to be configured with a simultaneous number of occupied NPUs for all cases that is more than the value reported by the UE capability.

In addition, it can be possible that a UE can report a preferred on/off duration and/or periodicity for the NPU(s). For example, if the NPU is dedicatedly used for wireless communication, it can be the case that it can be considered as always-on. As another example, if the NPU can be shared with other applications, it can be the case that it can be considered as on at a certain time duration, or can be interrupted by another application, and not always-on. For each NPU or each type of NPU for a use case, the UE can report maximum capability information for the neural network processing, such as a maximum number of layers and a maximum number of nodes per layer.

NPU occupancy rules can be defined differently for different possible areas of use for neural network processing. As one possibility for a NPU occupancy rule for machine learning based beam prediction, for a periodic report or semi-persistent report, a NPU can be occupied starting from the first symbol of the first downlink (DL) reference signal (RS) for measurement until the last symbol of the uplink channel with reported information on the predicted beam(s). As another possibility for a NPU occupancy rule for machine learning based beam prediction, for a periodic report or semi-persistent report, a NPU can be occupied starting from 'Y1' symbols after the last symbol of the last DL RS until 'Y2' symbols before the first symbol of the uplink channel with reported information on the predicted beam(s). For an aperiodic report, a NPU can be occupied starting from the first symbol of the PDCCH triggering the report until the last symbol of the uplink channel with reported information on the predicted beam(s), as one possibility, or starting from Y1 symbols after the last symbol of the PDCCH triggering the report until Y2 symbols before the first symbol of the uplink channel with reported information on the predicted beam(s), as another possibility. The parameters Y1 and Y2 can be predefined or reported as part of UE capability information, among various possibilities. Note that variations on or alternatives to these examples of NPU occupancy rules for machine learning based beam prediction are also possible.

Figure 7:
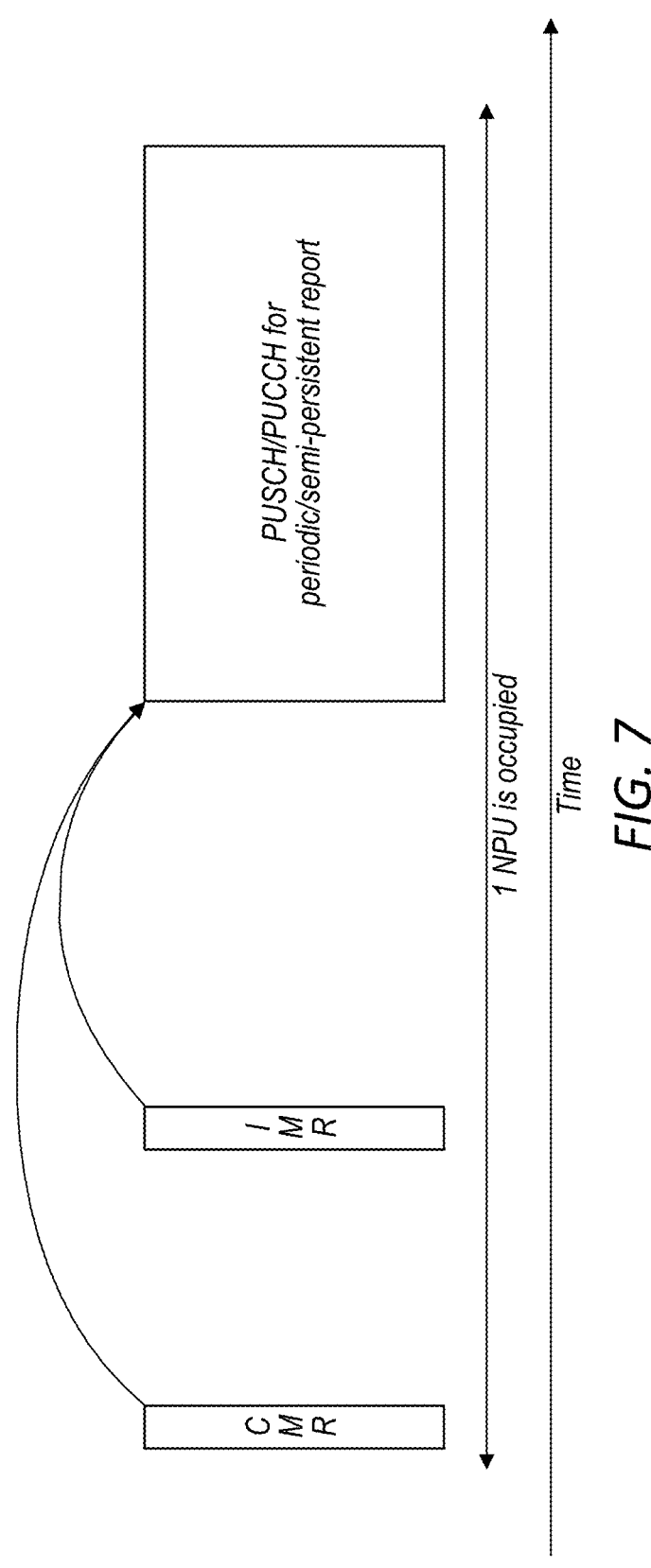
FIGS. 7-10 illustrate possible example timing aspects for wireless communication systems following various possible neural network processing occupancy rules, according to some embodiments.
Figure 8:
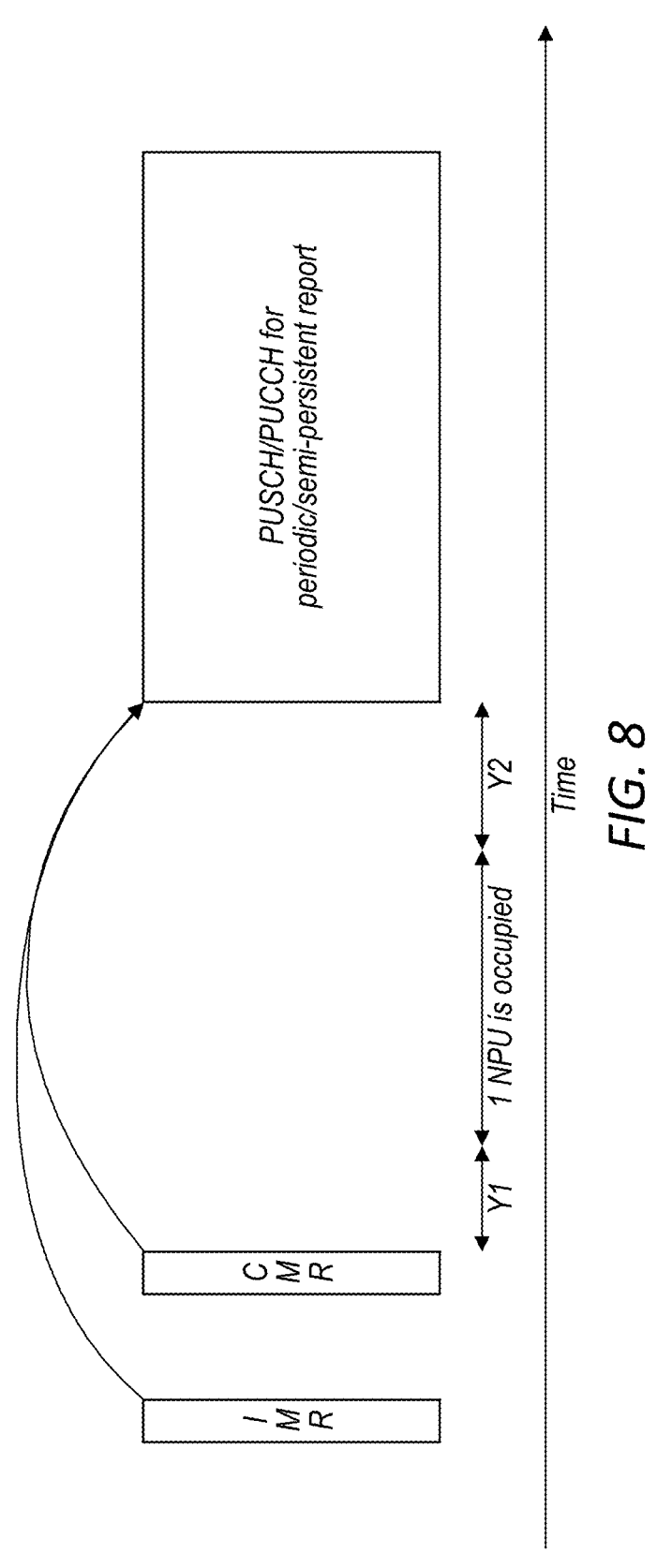
Figure 9:
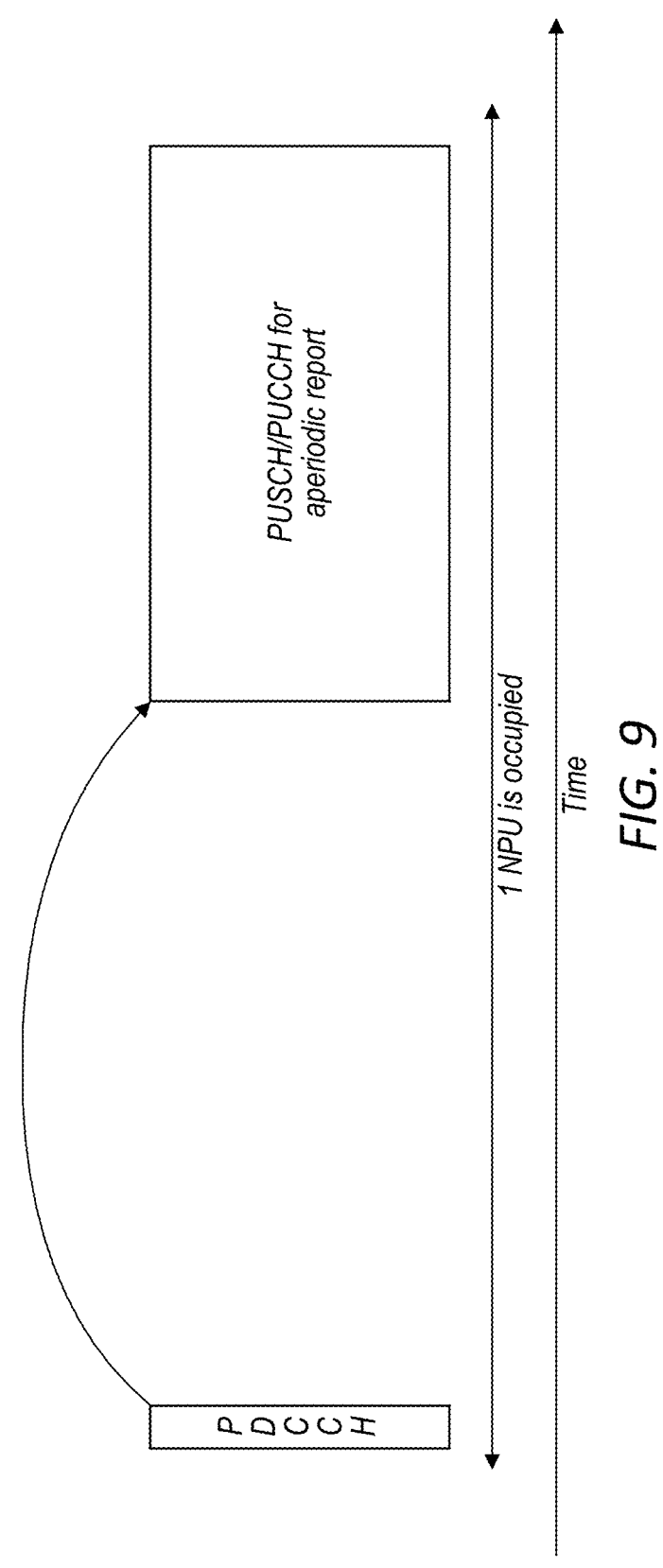
Figure 10:
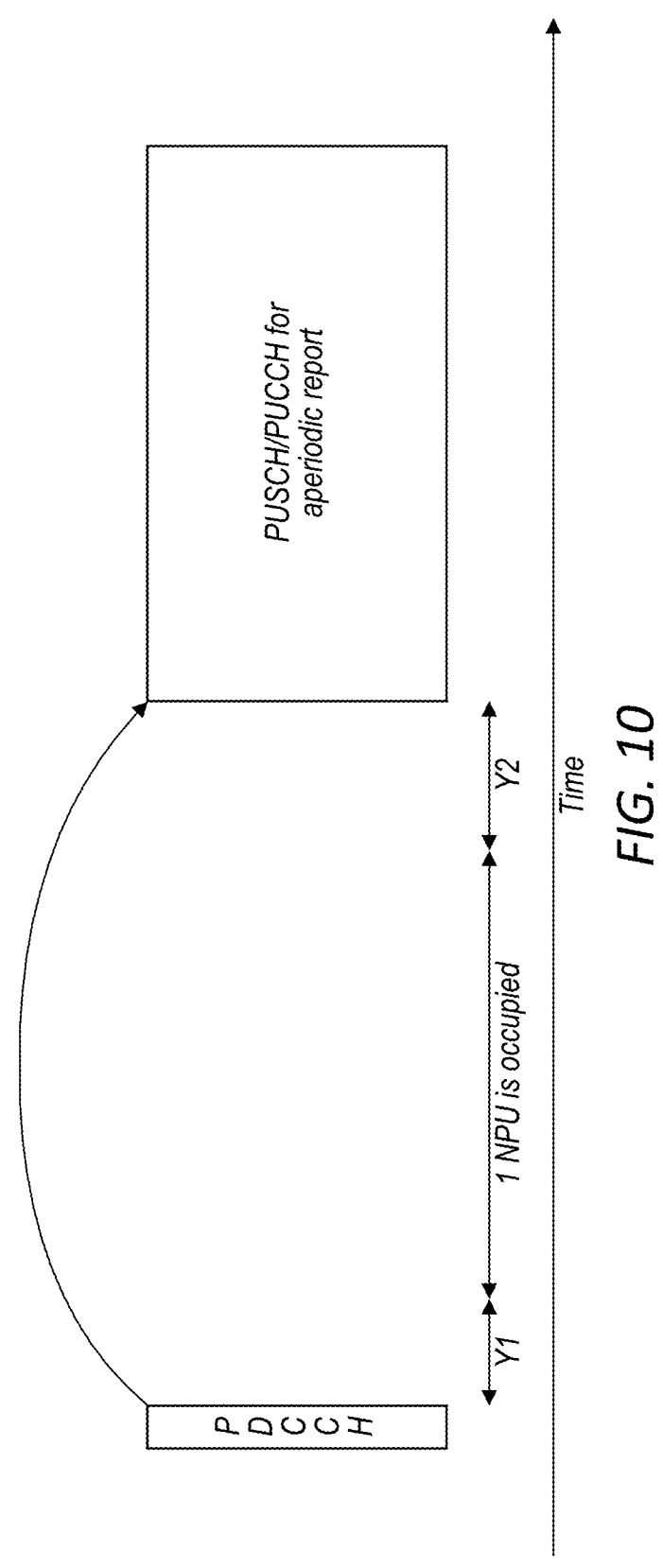

As one possibility for a NPU occupancy rule for machine learning based CSI measurement and reporting, for a periodic report or semi-persistent report, a NPU can be occupied starting from the first symbol of CMR and/or IMR until the last symbol of the uplink channel with the CSI report. FIG. 7 illustrates possible example timing aspects for a wireless communication system following such a rule, according to some embodiments. As another possibility for a NPU occupancy rule for machine learning based CSI measurement and reporting, for a periodic report or semi-persistent report, a NPU can be occupied starting from 'Y1' symbols after the last symbol of the last CMR/IMR until 'Y2' symbols before the first symbol of the uplink channel with the CSI report. FIG. 8 illustrates possible example timing aspects for a wireless communication system following such a rule, according to some embodiments. For an aperiodic report, a NPU can be occupied starting from the first symbol of the PDCCH triggering the report until the last symbol of the uplink channel with the CSI report, as one possibility. FIG. 9 illustrates possible example timing aspects for a wireless communication system following such a rule, according to some embodiments. Alternatively, for an aperiodic report, a NPU can be occupied starting from Y1 symbols after the last symbol of the PDCCH triggering the report until Y2 symbols before the first symbol of the uplink channel with the CSI report, as another possibility. FIG. 10 illustrates possible example timing aspects for a wireless communication system following such a rule, according to some embodiments. The parameters Y1 and Y2 can be predefined or reported as part of UE capability information, among various possibilities. Note that it can be possible for the same (e.g., consistent Y1 and/or Y2) or different (e.g., Y1 versus Y1' and/or Y2 versus Y2') values for Y1 and Y2 to be used for the NPU occupancy rule for machine learning based beam prediction and for the NPU occupancy rule for machine learning based CSI measurement and reporting, according to various embodiments. Note also that variations on or alternatives to these examples of NPU occupancy rules for machine learning based CSI reporting are also possible.

As one possibility for a NPU occupancy rule for machine learning based positioning estimation, a NPU can be occupied starting from the first symbol of the positioning reference signal (PRS) until 'X' symbols or slots have passed. Similar to the Y1 and Y2 parameters previously described herein, X can be predefined or reported as part of UE capability information, among various possibilities.

In case a scenario occurs in which all NPUs are occupied and it may not be possible for a UE to process all assigned tasks, and/or for other possible purposes, it can be useful to introduce a priority indicator for jobs associated with NPUs. For example, with such a framework in place, if all NPUs are occupied for a UE, and a job with higher priority is triggered, the UE can be able to stop the process with the lowest priority, e.g., to be able to process the job with the higher priority. For jobs configured with the same priority indicator, the UE can choose a job to drop (or interrupt) based on the starting time, type of job, component carrier type and index, and/or based on any of various other possible considerations. As one example, a UE could drop jobs based on a specified or configured priority order such as primary cell>secondary cell, beam management>channel state information>positioning, and starting earlier>starting later.

Figure 11:
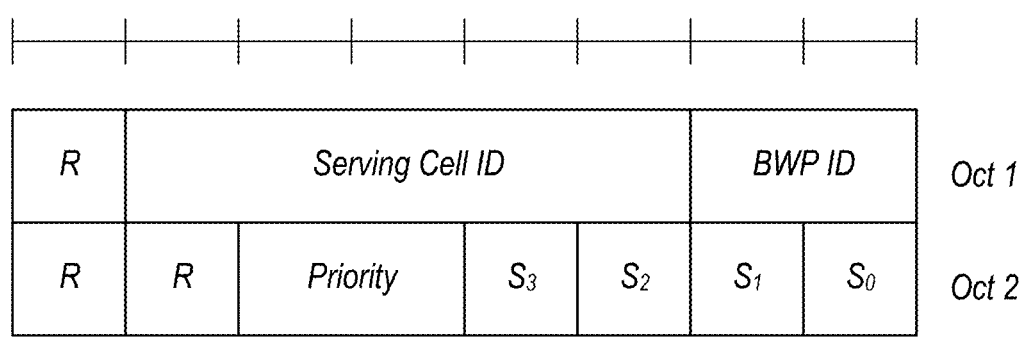
FIG. 11 illustrates an example MAC CE format including a field for indicating priority for a neural network processing task, according to some embodiments.

As one possibility, the priority indicator can be configured by RRC signaling. For example, it can be possible to configure the priority indicator for each NPU related job (e.g., in a CSI-reportConfig information element). As another possibility, the priority indicator can be configured by media access control (MAC) control element (CE). For example, for a MAC CE for semi-persistent report, the priority can be indicated by the triggering MAC CE. A 2-bit priority field could be used to indicate the priority for the report. In some embodiments, the remainder of the fields of the MAC CE can be as indicated in 3GPP 38.321 v.16.7.0 section 6.1.3.16. FIG. 11 illustrates an example MAC CE format including such a priority field, according to some embodiments. As a further possibility, the priority indicator can be indicated by triggering DCI. As a still further possibility, a rule for determining priority can be configured, such as a rule according to which a report triggered later always has a higher priority (e.g., aperiodic report>semi-persistent report>periodic report).

Figure 12:
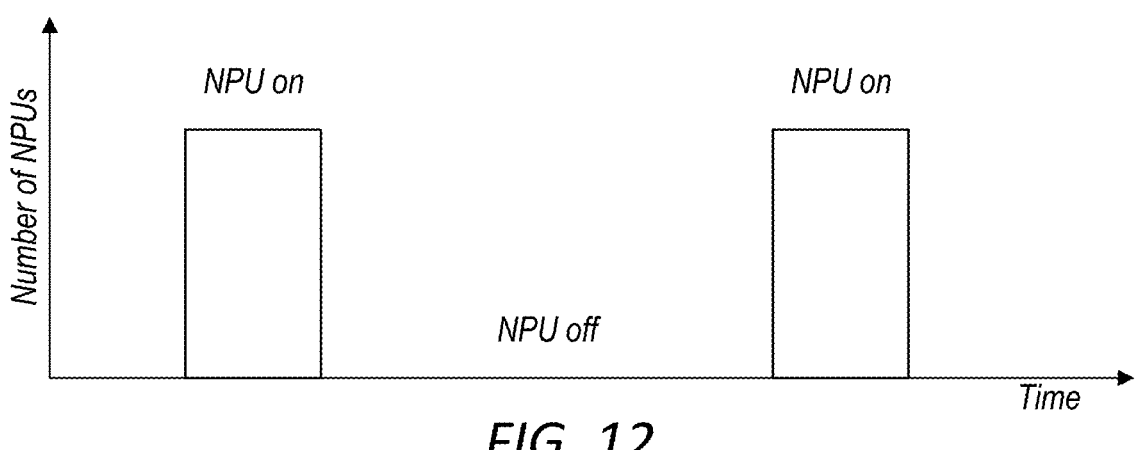
FIG. 12 illustrates example aspects of a NPU-DRX configuration, according to some embodiments.

In case of scenarios in which the NPU of a UE can be shared with other applications, a gNB can be able to configure a 'NPU-DRX' by higher layer signaling. When the NPU-DRX is in off duration, it can be the case that the UE can use the NPU for other purposes. When the NPU-DRX is in on duration, it can be the case that the UE may not use the NPU for other purposes. The NPU-DRX can be defined/configured for each NPU of a UE or for the UE (e.g., as a whole). FIG. 12 illustrates example aspects of such a NPU-DRX configuration, according to some embodiments.

Figure 13:
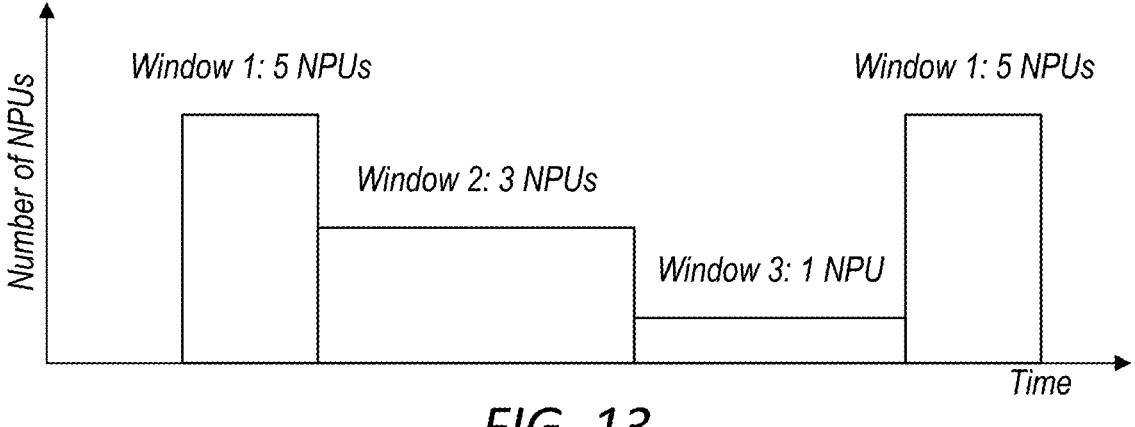
FIG. 13 illustrates aspects of an example scenario in which dynamic NPU usage can be configured, according to some embodiments.

As another possibility, a gNB can be able to configure the number of NPUs N reserved for wireless communication for a time duration for a UE. For example, for a UE with maximum number of NPUs '$N_{max}$,' the UE can be able to use the remaining $N_{max}$–N NPUs for other purposes. The offset, periodicity, and duration for the time duration can be configured by higher layer signaling. FIG. 13 illustrates aspects of an example scenario in which such dynamic NPU usage can be configured, according to some embodiments. In the illustrated example scenario, for a UE, a gNB can reserve 5 NPUs in a first time window, 3 NPUs in a second time window, and 1 NPU in a third time window, with the time windows repeating according to a configured periodic pattern.

In the following further exemplary embodiments are provided.

One set of embodiments can include a method, comprising: by a wireless device: establishing a wireless link with a cellular base station; determining neural network processing capability information for the wireless device; and providing the neural network processing capability information for the wireless device to the cellular base station.

According to some embodiments, the neural network processing capability information includes an indication of a number of supported neural network processing units (NPUs) for the wireless device.

According to some embodiments, the neural network processing capability information includes an indication of a number of supported neural network processing units (NPUs) for the wireless device for each of one or more of: beam prediction in spatial domain; beam prediction in time domain; channel state information measurement and reporting; or positioning estimation.

According to some embodiments, the neural network processing capability information includes availability information for neural network processing units (NPUs) for the wireless device.

According to some embodiments, the availability information for NPUs for the wireless device includes one or more of: an indication that one or more NPUs for the wireless device are always available for neural network processing tasks associated with the wireless link; or an indication of one or more of a preferred on duration, a preferred off duration, or a preferred periodicity of availability for one or more NPUs for the wireless device.

According to some embodiments, the neural network processing capability information includes an indication of a number of layers and a number of nodes per layer with which the wireless device is capable of performing neural network processing for one or more neural network processing units (NPUs) for the wireless device.

According to some embodiments, the method further comprises: receiving information from the cellular base station configuring the wireless device to perform a neural network processing activity; determining a neural network processing unit occupancy duration for the neural network processing activity; and performing the configured neural network processing activity.

According to some embodiments, the neural network processing activity includes one or more of: beam prediction and reporting; channel state information measurement and reporting; or wireless device positioning estimation.

According to some embodiments, the method further comprises: determining that neural network processing activity greater than neural network processing capability for the wireless device is configured by the cellular base station; and determining one or more neural network processing activities to drop based at least in part on neural network processing activity configured by the cellular base station being greater than neural network processing capability for the wireless device.

According to some embodiments, the one or more neural network processing activities to drop are determined based at least in part on priority indications for the one or more neural network processing activities, wherein neural network processing activities with lowest priority indications are dropped until a remaining number of neural network processing activities configured by the cellular base station is within the neural network processing capability for the wireless device.

According to some embodiments, the priority indications for the one or more neural network processing activities are received by the wireless device via one or more of: radio resource control (RRC) signaling; media access control (MAC) control element (CE) signaling; or downlink control information (DCI) signaling.

Another set of embodiments can include a wireless device, comprising: one or more processors; and a memory having instructions stored thereon, which when executed by the one or more processors, perform steps of the method of any of the preceding examples.

Yet another set of embodiments can include a method, comprising: by a cellular base station: establishing a wireless link with a wireless device; receiving neural network processing capability information from the wireless device; and configuring one or more neural network processing activities for the wireless device, wherein the one or more neural network processing activities are configured based at least in part on the neural network processing capability information.

According to some embodiments, the neural network processing capability information includes an indication of a number of supported neural network processing units (NPUs) for the wireless device, wherein configuring one or more neural network processing activities for the wireless device based at least in part on the neural network processing capability information includes limiting number and type of neural network processing activities configured for the wireless device to be within neural network processing capability for the wireless device.

According to some embodiments, the method further comprises: determining neural network processing unit occupancy duration for the one or more neural network processing activities configured for the wireless device, wherein limiting number and type of neural network processing activities configured for the wireless device to be within neural network processing capability for the wireless device is further based at least in part on the determined neural network processing unit occupancy duration for the one or more neural network processing activities configured for the wireless device.

According to some embodiments, the neural network processing capability information includes availability information for neural network processing units (NPUs) for the wireless device, wherein the method further comprises: determining an availability pattern for NPUs for the wireless device based at least in part on the availability information for NPUs for the wireless device; and providing an indication of the availability pattern for NPUs for the wireless device to the wireless device.

According to some embodiments, the neural network processing capability information includes an indication of a number of layers and a number of nodes per layer with which the wireless device is capable of performing neural network processing for one or more neural network processing units (NPUs) for the wireless device.

According to some embodiments, the method further comprises: providing priority information for the one or more neural network processing activities to the wireless device, wherein the priority information for the one or more neural network processing activities is provided via one or more of: radio resource control (RRC) signaling; media access control (MAC) control element (CE) signaling; or downlink control information (DCI) signaling.

Still another set of embodiments can include a cellular base station, comprising: one or more processors; and a memory having instructions stored thereon, which when executed by the one or more processors, perform steps of the method of any of the preceding examples.

A further set of embodiments can include a computer program product, comprising computer instructions which, when executed by one or more processors, perform steps of the method of any of the preceding examples.

A still further exemplary embodiment can include a method, comprising: performing, by a wireless device, any or all parts of the preceding examples.

Another exemplary embodiment can include a device, comprising: an antenna; a radio coupled to the antenna; and a processing element operably coupled to the radio, wherein the device is configured to implement any or all parts of the preceding examples.

A further exemplary set of embodiments can include a non-transitory computer accessible memory medium comprising program instructions which, when executed at a device, cause the device to implement any or all parts of any of the preceding examples.

A still further exemplary set of embodiments can include a computer program comprising instructions for performing any or all parts of any of the preceding examples.

Yet another exemplary set of embodiments can include an apparatus comprising means for performing any or all of the elements of any of the preceding examples.

Still another exemplary set of embodiments can include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) can be the basis of a corresponding method for operating a base station, by interpreting each message/ signal X received by the UE in the downlink as message/ signal X transmitted by the base station, and each message/ signal Y transmitted in the uplink by the UE as a message/ signal Y received by the base station.

Embodiments of the present disclosure can be realized in any of various forms. For example, in some embodiments, the present subject matter can be realized as a computer-implemented method, a computer-readable memory medium, or a computer system. In other embodiments, the present subject matter can be realized using one or more custom-designed hardware devices such as ASICs. In other embodiments, the present subject matter can be realized using one or more programmable hardware elements such as FPGAs.

In some embodiments, a non-transitory computer-readable memory medium (e.g., a non-transitory memory element) can be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) can be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device can be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
establishing a wireless link with a cellular base station;
determining neural network processing capability information for a wireless device, wherein the neural network processing capability information includes one or more indications of a number of supported neural network processing units (NPUs) for the wireless device for beam prediction in a spatial domain, beam prediction in a time domain, and positioning estimation; and
providing the neural network processing capability information for the wireless device to the cellular base station.

2. The method of claim 1,
wherein the neural network processing capability information includes an other indication of a number of supported neural network processing units (NPUs) for the wireless device.

3. The method of claim 1,
wherein the indication indicates the number of supported NPUs for the wireless device for:
channel state information measurement and reporting.

4. The method of claim 1,
wherein the neural network processing capability information includes availability information for NPUs for the wireless device.

5. The method of claim 4, wherein the availability information for NPUs for the wireless device includes one or more of:
an other indication that one or more NPUs for the wireless device are always available for neural network processing tasks associated with the wireless link; or
an other indication of one or more of a preferred on duration, a preferred off duration, or a preferred periodicity of availability for one or more NPUs for the wireless device.

6. The method of claim 1,
wherein the neural network processing capability information includes an other indication of a number of layers and a number of nodes per layer with which the wireless device is capable of performing neural network processing for one or more NPUs for the wireless device.

7. The method of claim 1, wherein the method further comprises:
receiving information from the cellular base station configuring the wireless device to perform a neural network processing activity;
determining a neural network processing unit occupancy duration for the neural network processing activity; and
performing the neural network processing activity.

8. The method of claim 7, wherein the neural network processing activity includes one or more of:
beam prediction and reporting;
channel state information measurement and reporting; or
wireless device positioning estimation.

9. The method of claim 7, wherein the method further comprises:
determining that neural network processing activity greater than neural network processing capability for the wireless device is configured by the cellular base station; and
determining one or more neural network processing activities to drop based at least in part on neural network processing activity configured by the cellular base station being greater than neural network processing capability for the wireless device.

10. The method of claim 9,
wherein the one or more neural network processing activities to drop are determined based at least in part on priority indications for the one or more neural network processing activities, wherein neural network processing activities with lowest priority indications are dropped until a remaining number of neural network processing activities configured by the cellular base station is within the neural network processing capability for the wireless device.

11. The method of claim 10,
wherein the priority indications for the one or more neural network processing activities are received by the wireless device via one or more of:
radio resource control (RRC) signaling;
media access control (MAC) control element (CE) signaling; or
downlink control information (DCI) signaling.

12. A method, comprising:
establishing a wireless link with a wireless device;
receiving neural network processing capability information from the wireless device, wherein the neural network processing capability information includes one or more indications of a number of supported neural network processing units (NPUs) for the wireless device for beam prediction in a spatial domain, beam prediction in a time domain, and positioning estimation; and configuring one or more neural network processing activities for the wireless device, wherein the one or more neural network processing activities are configured based at least in part on the neural network processing capability information.

13. The method of claim 12, wherein configuring one or more neural network processing activities for the wireless device based at least in part on the neural network processing capability information includes limiting number and type of neural network processing activities configured for the wireless device to be within neural network processing capability for the wireless device.

14. The method of claim 13, wherein the method further comprises:

determining neural network processing unit occupancy duration for the one or more neural network processing activities configured for the wireless device, wherein limiting number and type of neural network processing activities configured for the wireless device to be within neural network processing capability for the wireless device is further based at least in part on the determined neural network processing unit occupancy duration for the one or more neural network processing activities configured for the wireless device.

15. The method of claim 12, wherein the neural network processing capability information includes availability information for NPUs for the wireless device, wherein the method further comprises:

determining an availability pattern for NPUs for the wireless device based at least in part on the availability information for NPUs for the wireless device; and providing an other indication of the availability pattern for NPUs for the wireless device to the wireless device.

16. The method of claim 12, wherein the neural network processing capability information includes an other indication of a number of layers and a number of nodes per layer with which the wireless device is capable of performing neural network processing for one or more (NPUs) for the wireless device.

17. The method of claim 12, wherein the method further comprises:

providing priority information for the one or more neural network processing activities to the wireless device, wherein the priority information for the one or more neural network processing activities is provided via one or more of:

radio resource control (RRC) signaling;

media access control (MAC) control element (CE) signaling; or downlink control information (DCI) signaling.

18. An apparatus, comprising:

a processor configured to, when executing instructions stored in a memory, to perform operations comprising:

establishing a wireless link with a wireless device;

receiving neural network processing capability information from the wireless device wherein the neural network processing capability information includes one or more indications of a number of supported neural network processing units (NPUs) for the wireless device for beam prediction in a spatial domain, beam prediction in a time domain, and positioning estimation; and configuring one or more neural network processing activities for the wireless device, wherein the one or more neural network processing activities are configured based at least in part on the neural network processing capability information.

19. The apparatus of claim 18, wherein configuring one or more neural network processing activities for the wireless device based at least in part on the neural network processing capability information includes limiting number and type of neural network processing activities configured for the wireless device to be within neural network processing capability for the wireless device.

20. The apparatus of claim 19, wherein the operations further comprise:

determining neural network processing unit occupancy duration for the one or more neural network processing activities configured for the wireless device, wherein limiting number and type of neural network processing activities configured for the wireless device to be within neural network processing capability for the wireless device is further based at least in part on the determined neural network processing unit occupancy duration for the one or more neural network processing activities configured for the wireless device.

* * * * *